US005537647A

United States Patent [19]

Hermansky et al.

[11] Patent Number: 5,537,647

[45] Date of Patent: Jul. 16, 1996

[54] NOISE RESISTANT AUDITORY MODEL FOR PARAMETRIZATION OF SPEECH

[75] Inventors: Hynek Hermansky, Denver, Colo.; Nelson H. Morgan, Oakland, Calif.

[73] Assignees: U S West Advanced Technologies, Inc., Boulder, Colo.; International Computer Science Institute, Berkley, Calif.

[21] Appl. No.: 972,247

[22] Filed: Nov. 5, 1992

Related U.S. Application Data

[63] Continuation-in-part of Ser. No. 747,181, Aug. 19, 1991, Pat. No. 5,450,522.

[51] Int. Cl.$^6$ .................. G01L 3/02; G01L 9/00

[52] U.S. Cl. .................. 395/2.2; 395/2.1

[58] Field of Search .................. 381/46–47; 395/2.35, 395/2.36, 2.37, 2.42, 2, 2.2, 2.1, 2.39

[56] References Cited

U.S. PATENT DOCUMENTS

| | | | |
|---|---|---|---|
| 4,433,210 | 2/1984 | Ostrowski et al. | 381/53 |
| 4,454,609 | 6/1984 | Kates | 381/68 |
| 4,461,024 | 7/1984 | Rengger et al. | 381/46 |
| 4,542,524 | 9/1985 | Laine | 381/53 |
| 4,709,390 | 11/1987 | Atal et al. | 381/51 |
| 4,797,926 | 1/1989 | Bronson et al. | 381/36 |
| 4,805,218 | 2/1989 | Bamberg et al. | 381/43 |
| 4,833,711 | 5/1989 | Ueda et al. | 381/47 |
| 4,852,181 | 7/1989 | Morito et al. | 381/46 |
| 4,885,790 | 12/1989 | McAulay et al. | 381/36 |
| 4,897,878 | 1/1990 | Boll et al. | 381/43 |
| 4,908,865 | 3/1990 | Doddington et al. | 381/43 |
| 4,918,735 | 4/1990 | Morito et al. | 381/47 |
| 4,932,061 | 6/1990 | Kroon et al. | 381/30 |
| 4,975,955 | 12/1990 | Taguchi | 381/36 |
| 4,975,956 | 12/1990 | Liu et al. | 381/36 |
| 5,165,008 | 11/1992 | Hermansky et al. | 381/36 |

OTHER PUBLICATIONS

Adaptive Post Filtering for Enhancement of Noisy Speech in the frequency Domain Kabal et al. 1991 IEEE Internation Symposium on Circuits and Systems pp. 312–315 vol. 1 Jun. 1991.

Perceptual linear predicitive (PLP) analysis of speech, by Hynek Hermansky, Apr., 1990.

Compensation For The Effect Of The Communciation Channel In Auditory–Like Analysis Of Speech, by Hynek Hermansky et al, Sep., 1991.

*Primary Examiner*—Allen R. MacDonald
*Assistant Examiner*—Richemond Dorvil
*Attorney, Agent, or Firm*—Brooks & Kushman

[57] ABSTRACT

A method and system are provided for alleviating the harmful effects of convolutional and additive noise in speech, such as due to the environmental noise and linear spectral modification, based on the filtering of time trajectories of an auditory-like spectrum in a particular spectral domain.

18 Claims, 4 Drawing Sheets

NOISE RESISTANT AUDITORY MODEL FOR PARAMETRIZATION OF SPEECH

CROSS-REFERENCE TO RELATED APPLICATION

This application is a continuation-in-part of U.S. patent application Ser. No. 747,181, filed Aug. 19, 1991, U.S. Pat. No. 5,450,522 and titled "Auditory Model For Parametrization of Speech", which is hereby expressly incorporated by reference in its entirety.

TECHNICAL FIELD

The invention relates to speech processing and, in particular, to a noise resistant auditory model for speech parameter estimation.

BACKGROUND ART

As is known, the first step for automatic speech recognition (ASR) is front-end processing, during which a set of parameters characterizing a speech segment is determined. Generally, the set of parameters should be discriminative, speaker-independent and environment-independent.

For the set to be discriminative, it should be sufficiently different for speech segments carrying different linguistic messages. A speaker-independent set should be similar for speech segments carrying the same linguistic message but spoken or uttered by different speakers, while an environment-independent set should be similar for the speech segments which carry the same linguistic message, produced in different environments, soft or loud, fast or slow, with or without emotions and processed by different communication channels.

U.S. Pat. No. 4,433,210, Ostrowski et al., discloses an integrated circuit phoneme-based speech synthesizer. A vocal tract comprised of a fixed resonant filter and a plurality of tunable resonant filters is implemented utilizing a capacitive switching technique to achieve relatively low frequencies of speech without large valued componentry. The synthesizer also utilizes a digital transition circuit for transitioning values of the vocal tract from phoneme to phoneme. A glottal source circuit generates a glottal pulse signal capable of being spectrally shaped in any manner desired.

U.S. Pat. No. 4,542,524 Laine, discloses a model and filter circuit for modeling an acoustic sound channel, uses of the model and a speech synthesizer for applying the model. An electrical filter system is employed having a transfer function substantially consistent with an acoustic transfer function modelling the sound channel. The sound channel transfer function is approximated by mathematical decomposition into partial transfer functions, each having a simpler spectral structure and approximated by a realizable rational transfer function. Each rational transfer functions has a corresponding electronic filter, the filters being cascaded.

U.S. Pat. No. 4,709,390, Atal et al., discloses a speech coder for linear predictive coding (LPC). A speech pattern is divided in successive time frames. Spectral parameter and multipulse excitation signals are generated for each frame and voiced excitation signal intervals of the speech pattern are identified, one of which is selected. The excitation and spectral parameter signals for the remaining voiced intervals are replaced by the multipulse excitation signal and the spectral parameter signals of the selected interval, thereby substantially reducing the number of bits corresponding to the succession of voiced intervals.

U.S. Pat. No. 4,797,926, Bronson et al., discloses a speech analyzer and synthesizer system. The analyzer is utilized for encoding and transmitting, for each speech frame, the frame energy, speech parameters defining the vocal tract (LPC coefficients), a fundamental frequency and offsets representing the difference between individual harmonic frequencies and integer multiples of the fundamental frequency for subsequent speech synthesis. The synthesizer, responsive to the transmitted information, calculates the phases and amplitudes of the fundamental frequency and the harmonics and uses the calculated information to generate replicated speech. The invention further utilizes either multipulse or noise excitation modeling for the unvoiced portion of the speech.

U.S. Pat. No. 4,805,218, Bamberg et al., discloses a method for speech analysis and speech recognition which calculates one or more difference parameters for each of a sequence of acoustic frames. The difference parameters can be slope parameters, which are derived by finding the difference between the energy of a given spectral parameter of a given frame and the energy, in a nearby frame, of a spectral parameter associated with a different frequency band, or energy difference parameters, which are calculated as a function of the difference between a given spectral parameter in one frame and spectral parameter in a nearby frame representing the same frequency band.

U.S. Pat. No. 4,885,790, McAulay et al., discloses a speech analysis/synthesis technique wherein a speech waveform is characterized by the amplitudes, frequencies and phases of component sine waves. Selected frames of samples from the waveform are analyzed to extract a set of frequency components, which are tracked from one frame to the next. Values of the components from one frame to the next are interpolated to obtain a parametric representation of the waveform, allowing a synthetic waveform to be constructed by generating a series of sine waves corresponding to the parametric representation.

U.S. Pat. No. 4,897,878, Boll et al., discloses a method and apparatus for noise suppression for speech recognition systems employing the principle of a least means square estimation implemented with conditional expected values. A series of optimal estimators are computed and employed, with their variances, to implement a noise immune metric, which enables the system to substitute a noisy distance with an expected value. The expected value is calculated according to combined speech and noise data which occurs in the bandpass filter domain.

U.S. Pat. No. 4,908,865, Doddington et al., discloses a speaker-independent speech recognition method and system. A plurality of reference frames of reference feature vectors representing reference words are stored. Spectral feature vectors are generated by a linear predictive coder for each frame of the input speech signals, the vectors then being transformed to a plurality of filter bank representations. The representations are then transformed to an identity matrix of transformed input feature vectors and feature vectors of adjacent frames are concatenated to form the feature vector of a frame-pair. For each reference frame pair, a transformer and a comparator compute the likelihood that each input feature vector for a frame-pair was produced by each reference frame.

U.S. Pat. No. 4,932,061, Kroon et al., discloses a multi-pulse excitation linear predictive speech coder comprising an LPC analyzer, a multi-phase excitation generator, means for forming an error signal representative of difference between an original speech signal and a synthetic speech signal, a filter for weighting the error signal and means responsive thereto for generating pulse parameters controlling the excitation generator, thereby minimizing a predetermined measure of the weighted error signal.

U.S. Pat. No. 4,975,955, Taguchi, discloses a speech signal coding and/or decoding system comprising an LPC analyzer for deriving input speech parameters which are then attenuated and fed to an LSP analyzer for deriving LSP parameters. The LSP parameters are then supplied to a pattern matching device which selects from a reference pattern memory the reference pattern which most closely resembles the input pattern from the LSP analyzer.

U.S. Pat. No. 4,975,956, Liu et al., discloses a low-bit-rate speech coder using LPC data reduction processing. The coder employs vector quantization of LPC parameters, interpolation and trellis coding for improved speech coding at low bit rates utilizing an LPC analysis module, an LSP conversion module and a vector quantization and interpolation module. The coder automatically identifies a speaker's accent and selects the corresponding vocabulary of codewords in order to more intelligibly encode and decode the speaker's speech.

Additionally, a new front-end processing technique for speech analysis, was discussed in Dr. Hynek Hermansky's article titled "Perceptual Linear Predictive (PLP) Analysis of Speech," J. Acoust. Soc. Am. 87(4), April, 1990, which is hereby expressly incorporated by reference in its entirety. In the PLP technique, an estimation of the auditory spectrum is derived utilizing three well-known concepts from the psychophysics of hearing: the critical-band spectral resolution, the equal-loudness curve and the intensity-loudness power law. The auditory spectrum is then approximated by an autoregressive all-pole model, resulting in a computationally efficient analysis that yields a low-dimensional representation of speech, properties useful in speaker-independent automatic speech recognition. A flow chart detailing the PLP technique is shown in FIG. 1.

Most current ASR front-ends are based on robust and reliable estimation of instantaneous speech parameters. Typically, the front-ends are discriminative, but are not speaker- or environment-independent. While training of the ASR system (i.e. exposure to a large number of speakers and environmental conditions) can compensate for the failure, such training is expensive and seldom exhaustive. The PLP front-end is relatively speaker independent, as it allows for the effective suppression of the speaker-dependent information through the selection of the particular model order.

Most speech parameter estimation techniques, including the PLP technique, however, are sensitive to environmental conditions since they utilize absolute spectral values that are vulnerable to deformation by steady-state non-speech factors, such as channel conditions and the like.

Non-linguistic factors, such as environmental noise and linear spectral modification, can wreak havoc with speech processing systems, and in particular, can greatly increase the errors in a speech recognition system. The application of a linear time-invariant filtering operation to a speech signal during recognizer testing can significantly impact performance, as can the addition of noise. While real-life conditions include many other effects that are difficult to control (such as non-linear and/or phoneme-specific distortions), the simple linear operations described above are sufficient to seriously impact performance. It has been noted that a simple change of microphones between training and testing sessions can increase errors by a large factor (e.g. from two to ten).

It is desirable to provide some robustness against errors caused by convolutional effects and additive noise since, in the general case, noise is both additive and convolutional; in particular, any real speech input includes both the effects of environmental echo response and microphone impulse response, as well as additive noise.

SUMMARY OF INVENTION

It is therefore an object of the present invention to provide an improved method (noise resistant) for the parametrization of speech that is robust to both additive noise and convolutional noise.

In carrying out the above object and other objects of the present invention, in a speech processing system including means for computing a plurality of temporal speech parameters including short-term parameters having time trajectories, a method is provided for alleviating the harmful effects of distortions of speech. The method comprises filtering data representing time trajectories of the short-term parameters of speech in a particular spectral domain to obtain a filtered spectrum, so as to minimize distortions due to convolutive noise and additive noise in speech.

A system is also provided for carrying out the above method.

The above object and other objects and features of the invention will be readily appreciated by one of ordinary skill in the art from the following detailed description of the best mode for carrying out the invention when taken in connection with the following drawings.

BEST MODE FOR CARRYING OUT THE INVENTION

Generally, the auditory model of the present invention is based on the model of human vision in which the spatial pattern on the retina is differentiated with consequent reintegration. Such a model accounts for the relative perception of shades and colors. The noise resistant auditory model of the present invention applies similar logic and assumes that relative values of components of the auditory-like spectrum of speech, rather than absolute values of the components, carry the information in speech.

Figure 1:
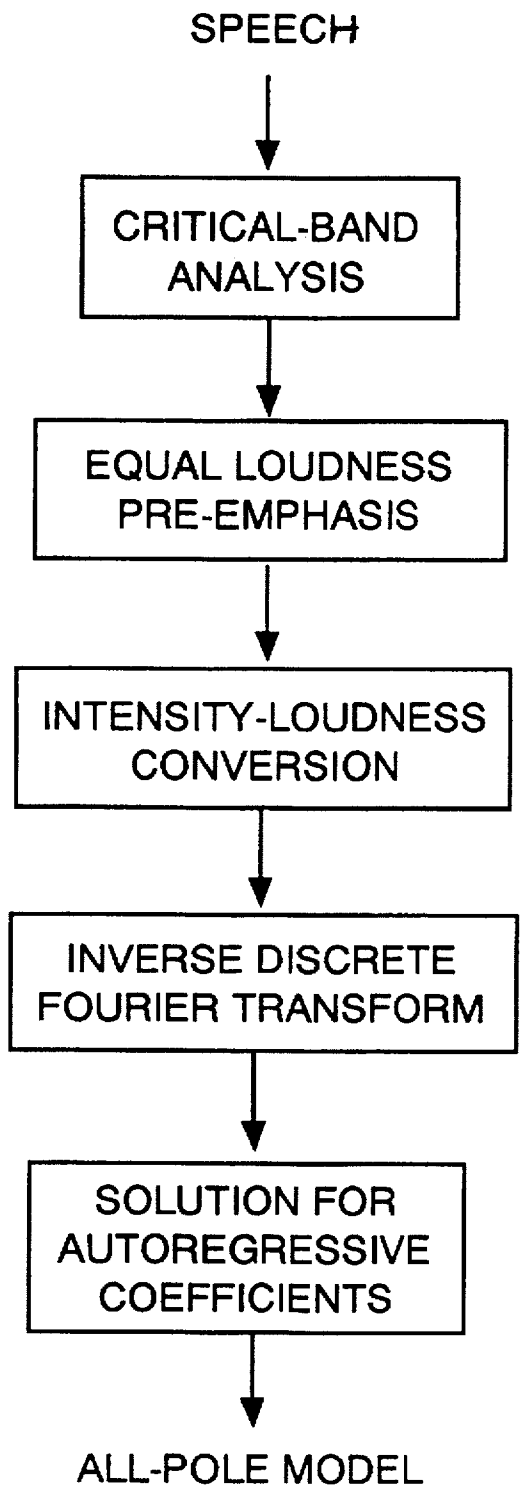
FIG. 1 is a flow chart illustrating the Perceptual Linear Predictive (PLP) technique for speech parameter estimation.
Figure 2:
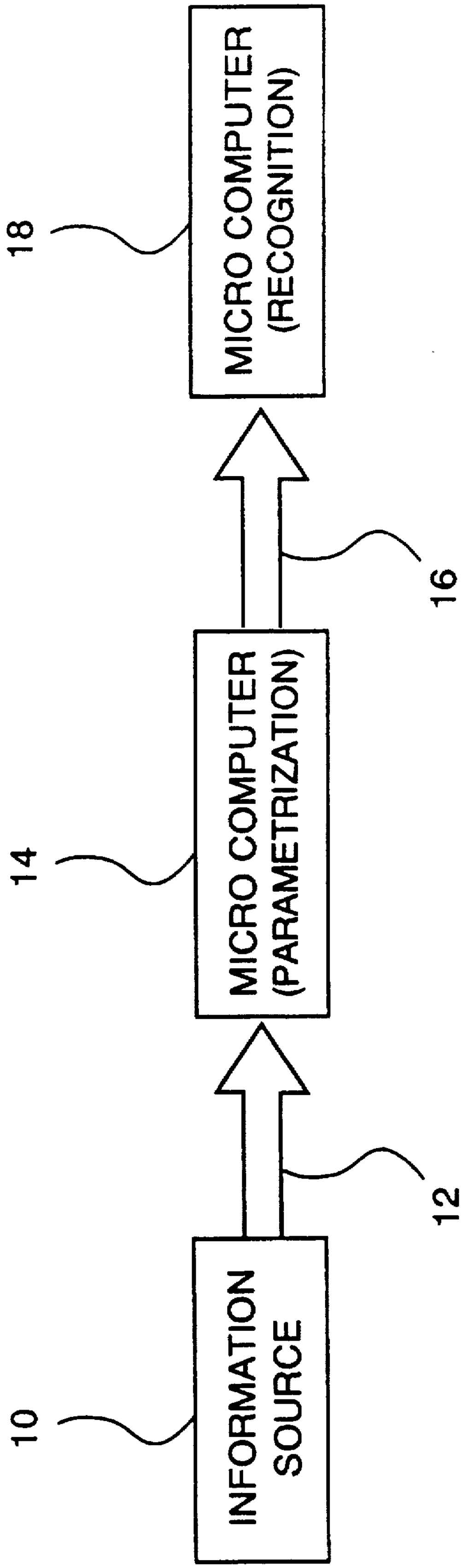
FIG. 2 is a block diagram of a system for implementing the Noise Resistant RelAtive SpecTrAl (NR RASTA) PLP technique of the present invention for speech parameter estimation.
Figure 3:
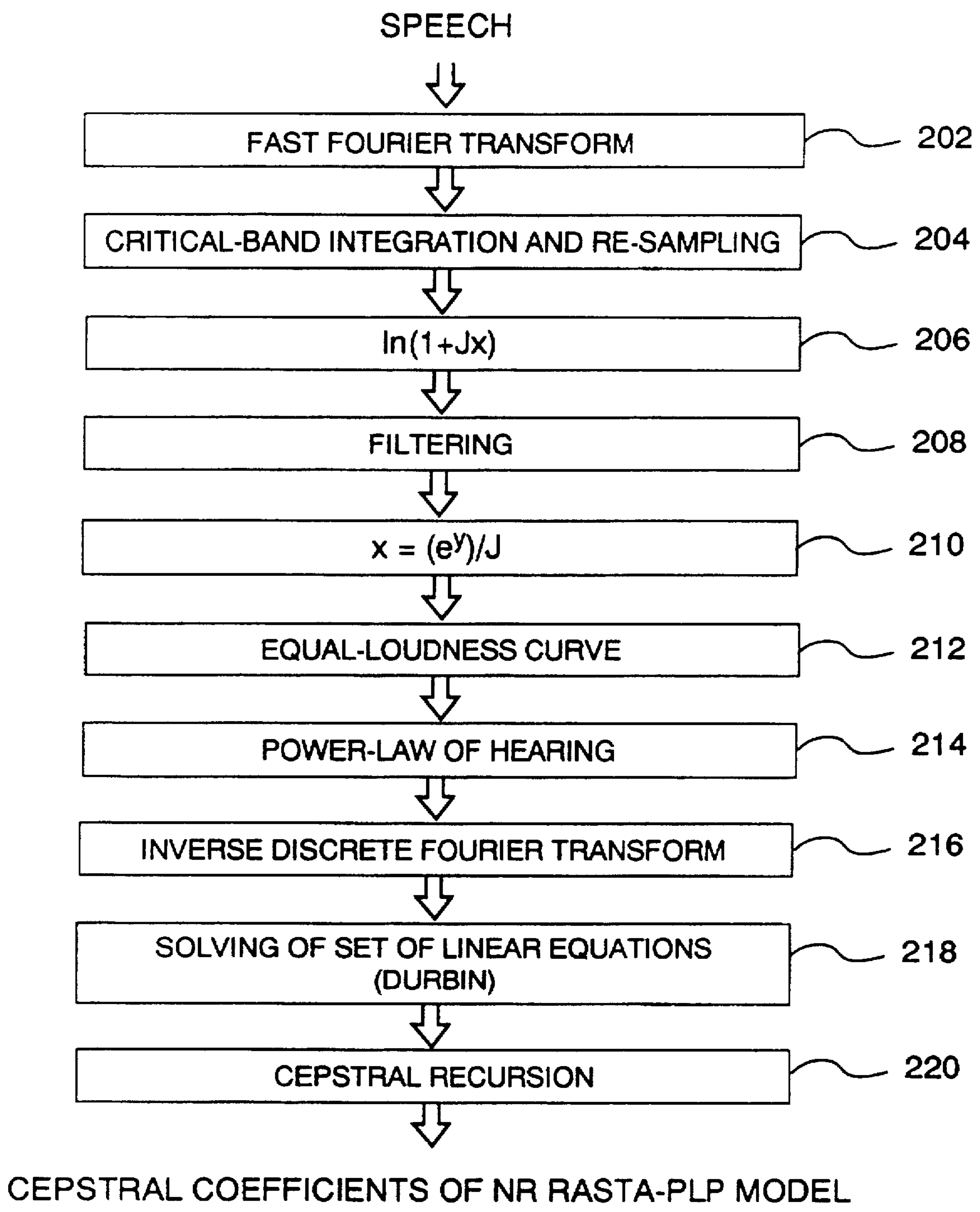
FIG. 3 is a flow chart illustrating the steps of the NR RASTA PLP technique of the present invention.

Referring now to FIG. 2 and FIG. 3, a block diagram of a system for implementing the Noise Resistant RelAtive SpecTrAl Perceptual Linear Predictive (NR RASTA PLP) technique for the parametric representation of speech, and a flow chart illustrating the methodology are shown.

In the preferred embodiment, speech signals from an information source 10, such as a human speaker, are transmitted over a plurality of communication channels 12, such as telephone lines, to a microcomputer 14. The microcomputer 14 segments the speech into a plurality of analysis frames and performs front-end processing according to the NR RASTA PLP methodology, described in greater detail herein below.

After front-end processing, the data is transmitted over a bus 16 to another microcomputer 18 which carries out the recognition. It should be noted that a number of well known speech recognition techniques such as dynamic time warping template matching, hidden markov modeling, neural net based pattern matching, or feature-based recognition, can be employed with the NR RASTA PLP methodology.

A PLP spectral analysis is performed at step 202 by first weighting each speech segment by a Hamming window. As is known, a Hamming window is a finite duration window and can be represented as follows:

$$W(n)=0.54+0.46\cos[2\pi n/(N-1)] \quad (1)$$

where N, the length of the window, is typically about 20 mS.

Next, the weighted speech segment is transformed into the frequency domain by a discrete Fourier transform (DFT). The real and imaginary components of the resulting short-term speech spectrum are then squared and added together, thereby resulting in the short-term power spectrum P(ω) and completing the spectral analysis. The power spectrum P(ω) can be represented as follows:

$$P(\omega)=Re[S(\omega)]^2+Im[S(\omega)]^2. \quad (2)$$

A fast Fourier transform (FFT) is preferably utilized, resulting in a transformed speech segment waveform. Typically, for a 10 kHz sampling frequency, a 256-point FFT is needed for transforming the 200 speech samples from the 20 mS window, padded by 56 zero-valued samples.

Critical-band integration and re-sampling is preferably performed at step 204. This step involves first warping the short-term power spectrum P(ω) along its frequency axis ω into the Bark frequency Ω as follows:

$$\Omega(\omega)=6\ln\left\{\frac{\omega}{1200\pi}+\left[\left(\frac{\omega}{1200\pi}\right)^2+1\right]^{0.5}\right\} \quad (3)$$

wherein ω is the angular frequency in rad/S, resulting in a Bark-Hz transformation. The warped power spectrum is then convolved with the power spectrum of the simulated critical-band masking curve Ψ(ω).

It should be appreciated that this step is similar to spectral processing in mel cepstral analysis, except for the particular shape of the critical-band curve. In the PLP technique, the critical-band curve is defined as follows:

$$\Psi(\Omega)=\begin{cases}0 & \text{for } \Omega<-1.3,\\ 10^{2.5(\Omega+0.5)} & \text{for } -1.3<\Omega<-0.5,\\ 1 & \text{for } -0.5<\Omega<0.5,\\ 10^{-1.0(\Omega-0.5)} & \text{for } 0.5<\Omega<2.5,\\ 0 & \text{for } \Omega>2.5.\end{cases} \quad (4)$$

This piece-wise shape for the simulated critical-band masking curve is an approximation to an asymmetric masking curve. Although it is a rather crude approximation of what is known about the shape of auditory filters, it exploits the proposal that the shape of auditory filters is approximately constant on the Bark scale. The filter skirts are generally truncated at −40 dB.

The discrete convolution of Ψ(Ω) with (the even symmetric and periodic function) P(ω) yields samples of the critical-band power spectrum $$\Theta(\Omega_i)=\sum_{\Omega=-1.3}^{2.5}P(\Omega-\Omega_i)\Psi(\Omega). \quad (5)$$

Thus, the convolution with the relatively broad critical-band masking curves ω(Ω) significantly reduces the spectral resolution of θ(Ω) in comparison with the original P(ω), allowing for the down-sampling of θ(Ω).

Preferably, θ(Ω) is sampled in approximately 1-Bark intervals. The exact value of the sampling interval is chosen so that an integral number of spectral samples covers the whole analysis band. Typically, 18 spectral samples of θ[Ω(ω)] are used to cover the 0–16.9-Bark (0–5 kHz) analysis bandwidth in 0.994-Bark steps.

For additive noise in the speech signal, a logarithmic power spectral domain is not appropriate, since the components which are additive in the time domain are not additive in the logarithmic power spectral domain, and therefore cannot be alleviated by band-pass filtering in this domain. A band-pass filtering is preferred to high-pass filtering, so as to smooth some of the analysis artifacts that might otherwise be accentuated by a high-pass filter. In fact, additive noise can even be exaggerated by a log operation. In principle, filtering the auditory spectrum itself should remove stationary additive components, such as additive noise. However, there are potential difficulties associated with such an approach, particularly with the negative values that inevitably result from high-pass filtering. In general, the NR RASTA PLP methodology utilizes a function that is approximately linear for low values of the auditory spectrum, and approximately logarithmic for larger values. In the case of significant additive noise, the function is preferably just an identity, while in the case of convolutional error, a log domain is preferred.

Figure 4:
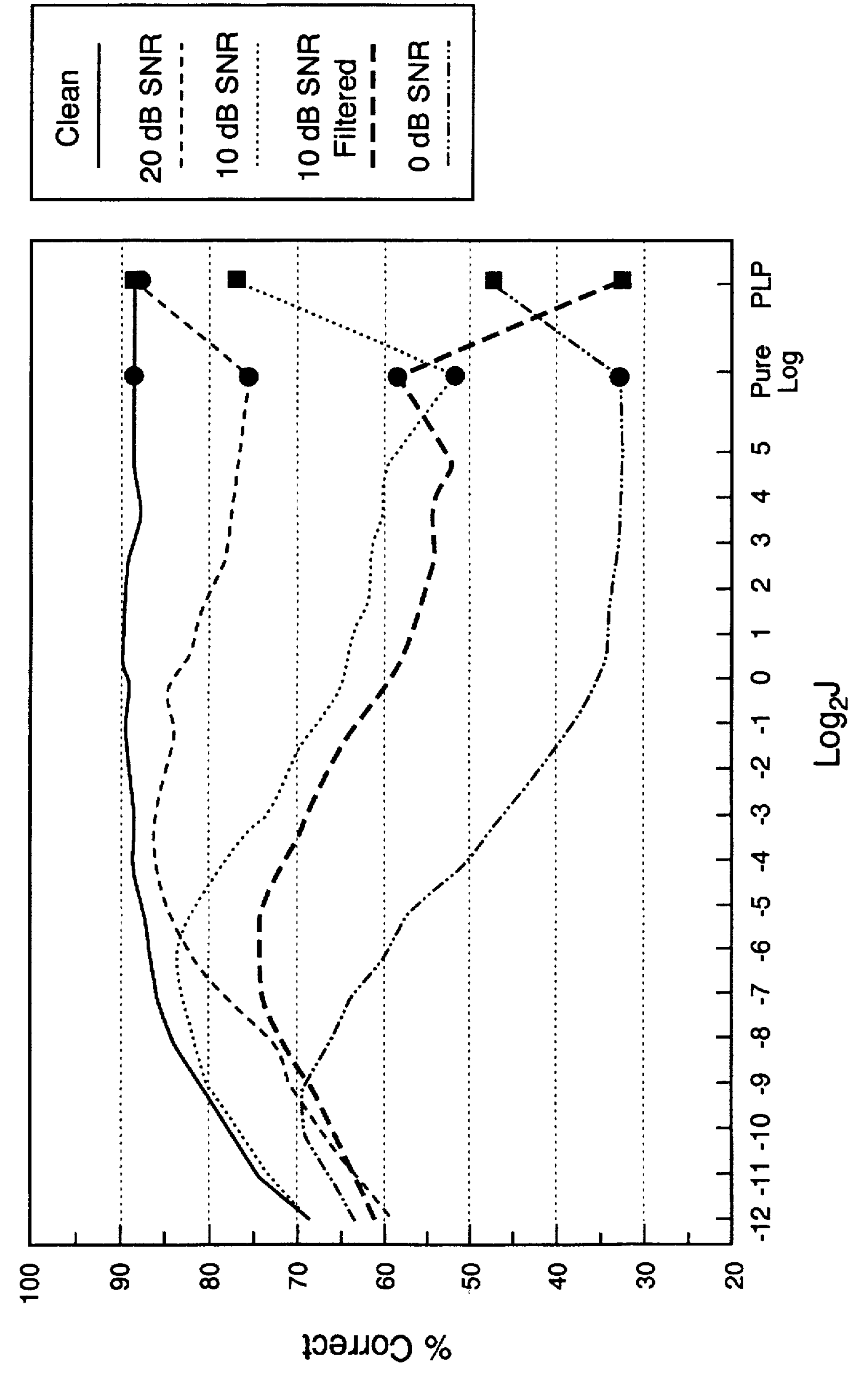
FIG. 4 is a graphical comparison of results obtained utilizing the NR RASTA PLP technique of the present invention.

Noting the Taylor expansion of ln(1+Jx):

$$\ln(1+Jx)=\ln(1)+Jx-(Jx)^2/2+ \quad (6)$$

it can be seen that for small values of Jx, the function is roughly linear. For larger values (compared with 1), the 1 can be disregarded and the function is roughly equivalent to ln(Jx). Therefore, at step 206 an operation, described by $$y=\ln(1+Jx) \quad (7)$$

is performed on the computed critical-band spectrum, where x=the critical-band spectrum, and J is a constant over some relatively long period of time over which the noise level remains relatively constant, that puts the function in the "correct" range. This intermediate domain yields good results for situations in which both convolutive and additive noise are present in the speech signal. Typical values for J for moderately noisy signals can be on the order of $1.0\times10^{-6}$, as indicated by FIG. 4. In a practical application, J will be set such that the recognizer works well. In principle, the optimum value for J is inversely proportional to noise level or signal-to-noise ratio, and any function that is roughly linear for small values and logarithmic for larger values could work well for this application. The basic idea is to have the low energy spectral values, for which the signal-to-noise ratio is relatively low, fall on the linear path of the non-linearity (Equation 7) and to have the higher energy spectral values, for which the signal-to-noise ratio is higher, fall on the logarithmic portion of the non-linearity.

As shown in FIG. 3, at step 208 the temporal filtering of the critical-band spectrum is performed. In the preferred embodiment, a bandpass filtering of each frequency channel is performed through an IIR filter. The high-pass portion of the equivalent bandpass filter alleviates the effect of the convolutional noise introduced in the channel and the low-pass filtering helps in smoothing out some of the fast frame-to-frame spectral changes due to analysis artifacts. The transfer function is preferably represented as follows:

$$H(z) = (.1)\frac{2 + z^{-1} - z^{-3} - 2z^{-4}}{[1 - 0.94z^{-1}](z^{-4})} \tag{8}$$

The low cut-off frequency of the filter is 0.9 Hz and determines the fastest spectral change of the log spectrum which is ignored in the output, while the high cut-off frequency (i.e. 12.8 Hz) determines the fastest spectral change which is preserved in the output parameters. The filter slope declines 6 dB/octave from 12.8 Hz with sharp zeros at 28.9 Hz and at the Nyquist frequency (50 Hz).

As is known, the result of any IIR filtering is generally dependent on the starting point of the analysis. In the NR RASTA PLP technique, the analysis is started well in the silent part preceding speech. It should be noted that the same filter need not be used for all frequency channels and that the filter employed does not have to be a bandpass filter or even a linear filter.

With continuing reference to FIG. 3, at step 210 an inverse transformation is performed. An exact inverse transformation, i.e.

$$x = \frac{1}{J}(e^{y} - 1) \tag{9}$$

is not guaranteed to be positive. Setting the negative values to zero, or some small value, has been shown to damage performance. Therefore, at step 210 an inexact or quasi-inverse transformation, i.e., $$x = \frac{1}{J}(e^{y}) \tag{10}$$

which is guaranteed to be positive, is performed. The optimal value of J is dependent on a level of noise corruption present in the signal. This is equivalent to taking the true inverse and adding (1/J), which is rather like adding a known amount of white noise to the output waveform.

At step 212, the sampled $\theta[\Omega(\omega)]$, described in greater detail above, is multiplied by the simulated fixed equal-loudness curve, as in the conventional PLP technique. The equal-loudness curve can be represented as follows:

$$\Xi[\Omega(\omega)|=E(\omega)\Theta[\Omega(\omega)] \tag{11}$$

It should be noted that the function E(ω) is an engineering approximation to the nonequal sensitivity of human hearing at different frequencies and simulates the sensitivity of hearing at about the –40 dB level. The approximation is preferably defined as follows:

$$E(\omega) = \frac{(\omega^2 + 56.8 \times 10^6)\omega^4}{\omega^2 + 6.3 \times 10^6)^2(\omega^2 + 0.38 \times 10^9)}. \tag{12}$$

This approximation represents a transfer function of a filter having asymptotes of 12 dB/octave between 0 Hz and 400 Hz, 0 dB/octave between 400 Hz and 1200 Hz, 6 dB/octave between 1200 Hz and 3100 Hz and 0 dB/octave between 3100 Hz and the Nyquist frequency. For moderate sound levels, this approximation performs reasonably well up to 5 kHz. For applications requiring a higher Nyquist frequency, an additional term representing a rather steep (e.g. −18 db/octave) decrease of the sensitivity of hearing for frequencies higher than 5 kHz might be found useful.

The corresponding approximation could then be represented as follows:

$$E(\omega) = \frac{(\omega^2 + 56.8 \times 10^6)\omega^4}{(\omega^2 + 6.3 \times 10^6)^2(\omega^2 + 0.38 \times 10^9)(\omega^6 + 9.58 \times 10^2}$$

Finally, the values of the first (0 Bark) and the last (Nyquist frequency) samples, which are not well defined, are made equal to the values of their nearest neighbors, so that $\Xi[\Omega(\omega)]$ begins and ends with two equal-valued samples.

As shown in FIG. 3, after multiplying by equal-loudness curve, an engineering approximation to the power law of hearing is performed at step 214 on the critical-band spectrum. This approximation involves a cubic-root amplitude compression of the spectrum as follows:

$$\Phi(\Omega)=\Xi(\Omega)^{0.33} \tag{14}$$

This approximation simulates the nonlinear relation between the intensity of sound and its perceived loudness. Together with the psychophysical equal-loudness preemphasis, described in greater detail above, this operation also reduces the spectral-amplitude variation of the critical-band spectrum so that an all-pole modeling, as discussed in greater detail below, can be done by a relatively low model order.

With continuing reference to FIG. 3, a minimum-phase all-pole model of the relative auditory spectrum $\Phi(\Omega)$ is computed at steps 216 through 220 according to the PLP technique utilizing the autocorrelation method of all-pole spectral modeling. At step 216, an inverse discrete Fourier transform (IDFT) is applied to $\Phi(\Omega)$ to yield the autocorrelation function dual to $\Phi(\Omega)$. Typically, a thirty-four (34) point IDFT is used. It should be noted that the applying an IDFT is a better approach than applying an IFFT, since only a few autocorrelation values are required.

The basic approach to autoregressive modeling of speech known as linear predictive analysis is to determine a set of coefficients that will minimize the mean-squared prediction error over a short segment of the speech waveform. One such approach is known as the autocorrelation method of linear prediction. This approach provides a set of linear equations relating to the autocorrelation coefficients of the signal and the prediction coefficients of the autoregressive model. Such a set of equations can be efficiently solved to yield the predictor parameters. Since the inverse Fourier transform of the non-negative spectrum-like function can be interpreted as the autocorrelation function, the appropriate autoregressive model of such spectrum can be found. In the preferred embodiment, these equations are solved at step 218 utilizing Durbin's well known recursive procedure, the efficient procedure for solving the specific linear equations of the autoregressive process.

The group-delay distortion measure is used in the PLP technique instead of the conventional cepstral distortion measure, since the group-delay measure is more sensitive to the actual value of the spectral peak width. The group-delay measure (i.e. frequency-weighted measure, index-weighted cepstral measure, root-power-sum measure) is implemented by weighting cepstral coefficients of the all-pole PLP model spectrum in the Euclidean distance by a triangular lifter.

As shown in FIG. 3, at step 220 the cepstral coefficients are computed recursively from the autoregressive coefficients of the all-pole model. The triangular liftering (i.e. the index-weighting of cepstral coefficients) is equivalent to computing a frequency derivative of the cepstrally smoothed phase spectrum. Consequently, the spectral peaks of the model are enhanced and its spectral slope is suppressed.

For a minimum-phase model, computing the Euclidean distance between index-weighted cepstral coefficients of two models is equivalent to evaluating the Euclidean distance between the frequency derivative of the cepstrally smoothed power spectra of the models. Thus, the group-delay distortion measure is closely related to a known spectral slope measure for evaluating critical-band spectra and is given by the equation $$d_{GD} = \sum_{i=1}^{p} i^2 (c_{iR} - c_{iT})^2 \quad (15)$$

where CiR and CiT are the cepstral coefficients of the reference and test all-pole models, respectively, and P is the number of cepstral coefficients in the cepstral approximation of the all-pole model spectra.

It should be noted that the index-weighting of the cepstral coefficients which was found useful in well known recognition techniques utilizing Euclidean distance such as is the dynamic time warping template matching is less important in some another well known speech recognition techniques, such as the neural net based recognition or continuous hidden markov modelling, which inherently normalize all input parameters.

The choice of the model order specifies the amount of detail in the auditory spectrum that is to be preserved in the spectrum of the PLP model. Generally, with increasing model order, the spectrum of the all-pole model asymptotically approaches the auditory spectrum $\Phi(\Omega)$. Thus, for the auto-regressive modeling to have any effect at all, the choice of the model order for a given application is critical.

A number of experiments with telephone-bandwidth speech have indicated that PLP recognition accuracy peaks at a $5^{th}$ order of the autoregressive model and is consistently higher than the accuracy of other conventional front-end modules, such as a linear predictive (LP) module. Because of these results, a $5^{th}$ order all-pole model is preferably utilized for telephone applications. A $5^{th}$ order PLP model also allows for a substantially more effective suppression of speaker-dependent information than conventional modules and exhibits properties of speaker-normalization of spectral differences.

It should be noted that the choice of the optimal model order can be dependent on the particular application. Typically, higher the sampling rate of the signal and larger the set of training speech samples, higher the optimal model order. Most conventional approaches to suppressing the effect of noise and/or linear spectral distortions typically require an explicit noise or channel spectral estimation phase. The NR RASTA PLP method, however, efficiently computes estimates on- line, which is beneficial in applications such as telecommunications, where channel conditions are generally not known a priori and it is generally not possible to provide an explicit normalization phase.

Referring now to FIG. 4, there is shown a graphical representation of experimentation results obtained utilizing the NR RASTA PLP methodology. The recognition vocabulary consisted of eleven (11) isolated digits plus two (2) control words (e.g. "yes" and "no") recorded by thirty (30) speakers over dialed-up telephone lines. Digits were hand end-pointed. The recognizer utilized was a DTW-based multi-template recognizer. Twenty-seven (27) speakers out of the thirty were used for training of the recognizer in a jack-knife experimental design, thus yielding 52780 recognition trials per experimental point. The recognizer was trained on this "clean" speech, and the test data were degraded by a realistic additive noise, recorded over a cellular telephone from an automobile travelling at approximately 55 miles per hour on a freeway with the windows closed. Several signal-to-noise ratios were investigated. Additionally, linear distortions simulating the difference between frequency response of the carbon microphone and the electret microphone in the telephone handset were also applied to one test set of data.

As shown in FIG. 4, a moderate value for J (e.g. $2^{-7}$) provided a significant improvement over a pure log RASTA PLP technique in all conditions except the "clean" case, in which the new function caused a small degradation. This suggests that by adapting J, NR RASTA PLP may not even degrade clean speech, since the performance for a large value of J is comparatively good. In general, it can be seen that log RASTA PLP helps in the case of a linear spectral distortion, but can even hurt when sufficient noise is added (with respect to simple PLP). On the other hand, NR RASTA PLP significantly improves over either earlier approach. In particular, the 10 dB-filtered curve shows significant robustness in the presence of both convolutive and additive error.

NR RASTA PLP is simple, and results such as those discussed above suggest that significant robustness to simultaneous additive and convolutional error can be achieved without finely-tuned long term noise or signal estimates.

It is understood, of course, that while the form of the invention herein shown and described constitutes the preferred embodiment of the invention, it is not intended to illustrate all possible forms thereof. It will also be understood that the words used are words of description rather than limitation and that various changes may be made without departing from the spirit and scope of the invention as disclosed.

What is claimed is:

1. For use in a speech processing system having means for computing a plurality of temporal speech parameters including short-term parameters having time trajectories, a method for alleviating harmful effects of distortions of speech, the method comprising:

performing a non-linear operation on a function of the short-term parameters of speech, the function being substantially linear for small values of the parameters and substantially logarithmic for large values of the parameters; and filtering data representing time trajectories of the short-term parameters of speech in a particular spectral domain to obtain a filtered spectrum and to minimize distortions due to convolutive noise and additive noise in speech.

2. The method of claim 1 wherein the particular spectral domain is an intermediate domain, between a time domain and a logarithmic power spectral domain, in which convolutive noise and additive noise in speech are transformed to error that is substantially additive in the filtered spectrum.

3. The method of claim 1 wherein the short-term parameters of speech are spectral parameters.

4. The method of claim 3 wherein the spectral parameters are parameters of an auditory spectrum.

5. The method of claim 1 wherein the step of filtering includes the step of bandpass filtering to simultaneously smooth the data and remove any influences due to slow variations in the parameters.

6. The method of claim 1 wherein the non-linear operation is an operation described by:

$$y = ln(1+Jx),$$

wherein x represents a critical-band spectrum and J represents a constant over a period of time during which a noise level remains relatively constant.

7. The method of claim 1 further comprising taking an inverse non-linear transformation of the filtered spectrum.

8. The method of claim 7 wherein the inverse non-linear transformation is an inexact transformation which ensures that after the inverse transformation, all spectral values remain non-negative, the inexact transformation described by:

$$y=\frac{1}{J}(e^y),$$

wherein y represents the result of the non-linear operation performed on the function of the short-term parameters of speech.

9. The method of claim 8 further comprising the step of approximating the filtered spectrum by a spectrum of an autoregressive model using an auto correlation method of linear predictive analysis.

10. For use in a speech processing system having means for computing a plurality of temporal speech parameters including short-term parameters having time trajectories, the system being useful for alleviating harmful effects of steady-state distortions of speech, the system comprising:

means for performing a non-linear operation on a function of the short-term parameters of speech, the function being substantially linear for small values of an amplitude and substantially logarithmic for large values of the amplitude; and means for filtering the time trajectories of the short-term parameters of speech in a particular spectral domain to obtain a temporal pattern in which distortions due to convolutive noise and additive noise in speech are minimized.

11. The system of claim 10 wherein the particular spectral domain is an intermediate domain, between a time domain and a logarithmic power spectral domain, in which convolutive noise and additive noise in speech are transformed to error that is substantially additive in the filtered spectrum.

12. The system of claim 10 wherein the short-term parameters are spectral parameters.

13. The system of claim 12 wherein the spectral parameters are parameters of an auditory spectrum.

14. The system of claim 10 wherein the means for filtering is a bandpass filter for simultaneously smoothing the data and removing the influence of slow variations in the parameters.

15. The system of claim 10 wherein the means for performing a non-linear operation includes means for performing an operation described by:

$$y=ln(1+Jx),$$

wherein x represents a critical-band spectrum and J represents a constant over a period of time during which a noise level remains relatively constant.

16. The system of claim 10 further comprising means for taking an inverse non-linear transformation of the filtered spectrum.

17. The system of claim 16 wherein the means for taking an inverse non-linear transformation includes means for taking an inexact transformation described by:

$$x+\frac{1}{J}(e^y),$$

wherein y represents the result of the non-linear operation performed on the function of the short-term parameters of speech.

18. The system of claim 10 further comprising means for approximating the filtered spectrum by a spectrum of an autoregressive model using an autocorrelation method of linear predictive analysis.

* * * * *